(12) United States Patent
Vachez

(10) Patent No.: US 6,170,280 B1
(45) Date of Patent: Jan. 9, 2001

(54) DEVICE FOR KEEPING FOOD IN A COLD ENVIRONMENT

(75) Inventor: Isabelle Vachez, Montreuil (FR)

(73) Assignee: Didier Ortion (FR)

( * ) Notice: Under 35 U.S.C. 154(b), the term of this patent shall be extended for 0 days.

(21) Appl. No.: 09/319,385

(22) PCT Filed: Dec. 3, 1997

(86) PCT No.: PCT/FR97/02191

§ 371 Date: Jun. 4, 1999

§ 102(e) Date: Jun. 4, 1999

(87) PCT Pub. No.: WO98/24346

PCT Pub. Date: Jun. 11, 1998

(30) Foreign Application Priority Data

Dec. 4, 1996 (FR) .................................................. 96 14885

(51) Int. Cl.[7] .................................................... A47F 3/04
(52) U.S. Cl. ................................................. 62/255; 62/258
(58) Field of Search .............................. 62/255, 256, 258, 62/426

(56) References Cited

U.S. PATENT DOCUMENTS

| | | | | |
|---|---|---|---|---|
| 2,632,310 | * | 3/1953 | Kopp et al. ............................. | 62/255 |
| 4,592,209 | * | 6/1986 | Casanova et al. ...................... | 62/255 |
| 4,628,697 | * | 12/1986 | Bruck et al. ............................ | 62/255 |
| 4,802,340 | * | 2/1989 | Johnson .................................. | 62/258 |
| 5,191,769 | * | 3/1993 | Mangini et al. ........................ | 62/258 |
| 5,282,367 | * | 2/1994 | Moore et al. ........................... | 62/256 |
| 5,317,881 | * | 6/1994 | Colvin .................................... | 62/256 |
| 5,477,702 | * | 12/1995 | Kennedy et al. ....................... | 62/256 |

* cited by examiner

Primary Examiner—William E. Tapolcal
(74) Attorney, Agent, or Firm—Rothwell, Figg, Ernst & Manbeck, P.C.

(57) ABSTRACT

A device for maintaining a layer of cooled air over a work area, comprising a zone for processing, presentation or laying out food, said zone having an upper surface, a lower surface, a front edge where a user is optionally positioned, and lateral edges, said zone being upwardly open and in contact on its upper and lower surfaces with a layer of cooled air, a means for generating a flow of cooled air to create a layer of cooled air, an air flow channeling circuit comprising a flow delivery opening above the zone, a recovery opening to capture the air flow passing over the zone, and a flow circulation conduit connecting the delivery and recovery openings, the flow circulation conduit passing below the lower surface of the zone, wherein the air flow delivery and recovery openings are disposed laterally so that the air flow circulates between the openings, and wherein the air flow circulation conduit has a substantially horizontal section delimited on its upper part by the lower surface of the zone and is attached laterally to two elbows for reorientation of the air flow, one of said elbows terminating at the delivery opening and the other of said elbows terminating at the recovery opening, both elbows situated substantially at the same height above the opposite lateral extremities of the zone, and wherein the zone has a work surface bordered by a removable strip for holding accessories.

8 Claims, 3 Drawing Sheets

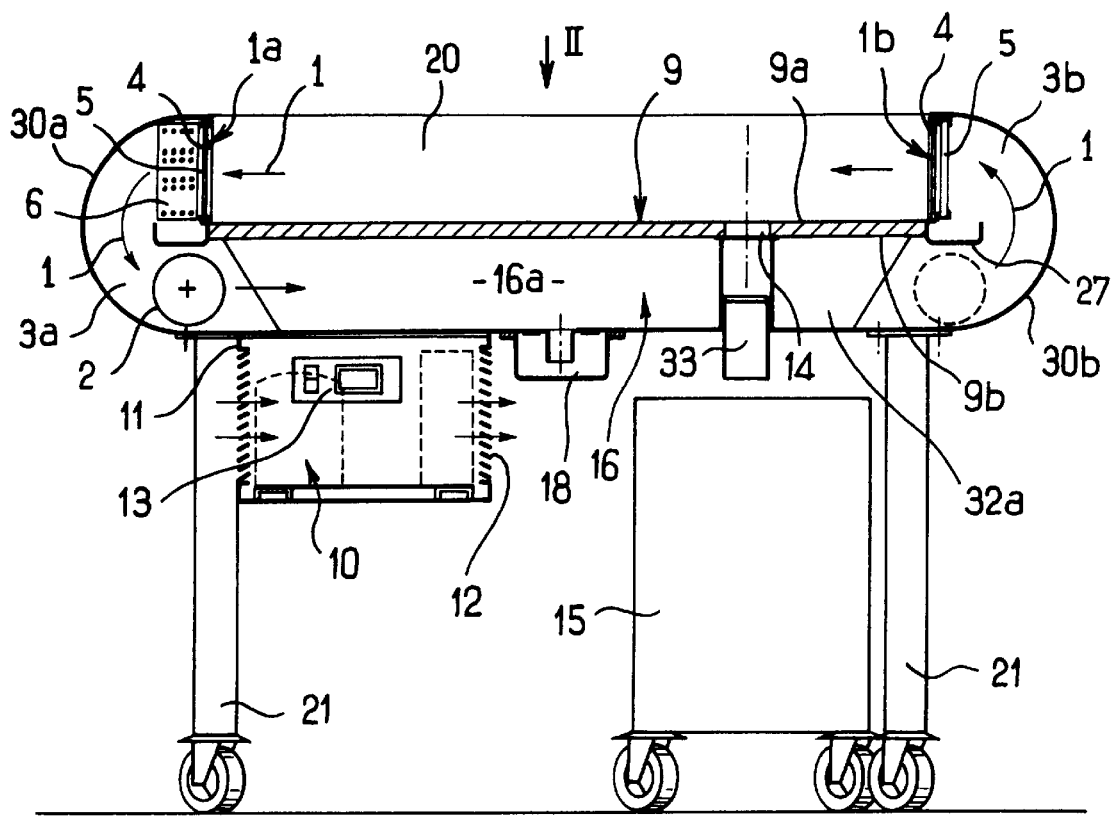
FIG_1
FIG_2

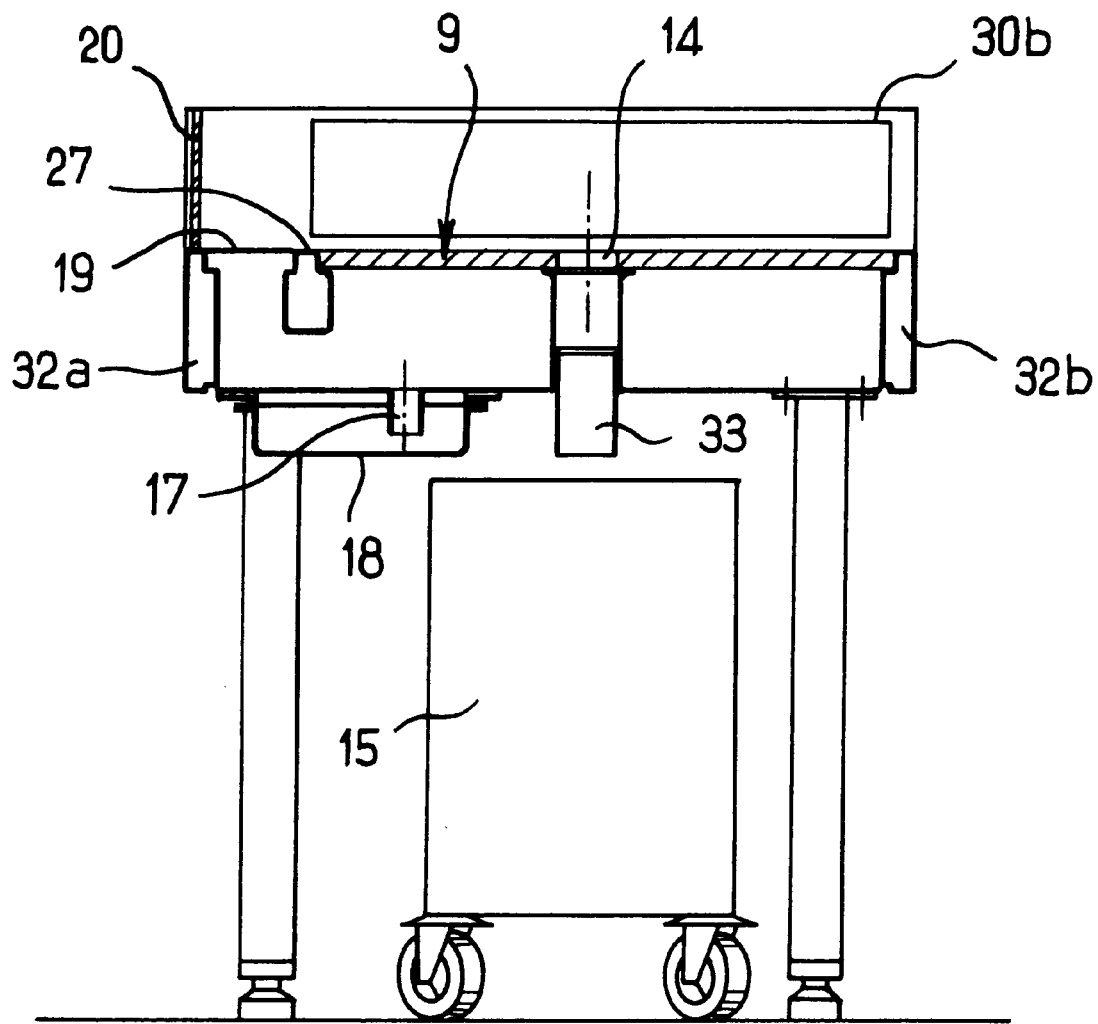
FIG_3

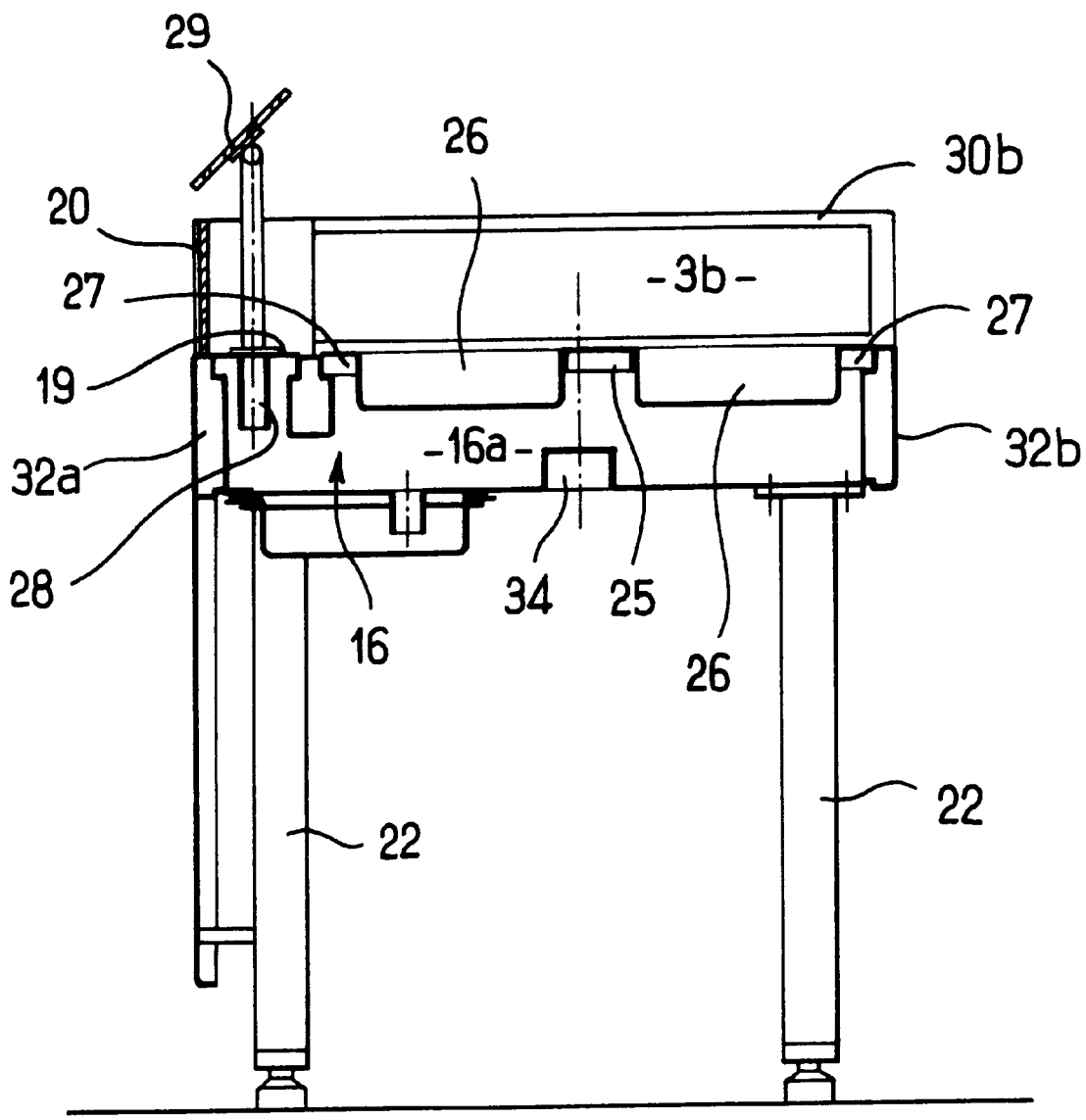
FIG_4

DEVICE FOR KEEPING FOOD IN A COLD ENVIRONMENT

The present invention relates to a device for maintaining a layer of air (or more generally gas) at a cool, and preferably substantially constant temperature the air lying over a work surface or equivalent to be used for various preparations necessitating a particular temperature and preferably filtering of the ambient air.

Preparations, such as culinary preparations, usually take place on inert working surfaces. Temperature controls and filtering of the air are therefore needed for the whole of the area covering the working surface, which necessitates fixed technical means having demanding energy requirements. Moreover the temperatures required for some products, in order not to break the cold chain in certain fields of activity, such as the farm produce industry, is incompatible with work legislation, for example meat which is worked while stationary for prolonged periods of time, and the interior of which must be maintained at a temperature of +3° C., whilst the area itself is at an ambient temperature of 10 to 12° C.

The device according to the invention permits these disadvantages to be remedied by maintaining the various preparations or foods present on the "working surface" at a temperature determined by regulations.

In the prior art there are however, such devices for the working, presentation or laying out of edible food comprising:

a zone for the work, presentation or laying out of the said food, having an upper surface and a lower surface, such area often being upwardly open, on its upper face, where it is in contact with a cool layer of gas, such as air, and cooling means, to cool this layer of gaseous fluid to a temperature lower than the local ambient temperature.

Problems nevertheless remain, linked notably to the relative complexity of these devices, their cost and the manner in which the cooling or the maintenance of a cool temperature is assured. In this regard, the efficacy of the existing devices is open to doubt at least when it is not a question of large store-rooms which are more similar to refrigerators open at the front rather than to devices for presentation or working of foodstuffs, in the manner of stands or tables, as in the invention.

Also, to resolve the above-described problems of cost, high consumption of energy for cooling, and the efficacy with which the required temperatures is maintained in the immediate proximity of the zone where the foods are laid out, it is proposed in the invention that the said area, called "the work, presentation or laying out area" of these foods should be further (directly) in contact on its lower surface with a layer of the said gaseous fluid, substantially at the said cool temperature. The work, presentation and/or the laying out of the foods will therefore be carried out in ambient air different from that of the local area.

The production of the necessary cooling is thus essentially limited to the volume of air lying over the working surface of the device. The gas (usually air) can be diffused by heat loss forced ventilation or recycled cold air. The air thus diffused can be filtered.

Refrigerating equipment and, preferably, horizontal cooling diffusers allow the food to be maintained in the interior of a mass of cooled air, being thermally separated from the ambient conditions of the area. For greater convenience, the user of the device will be positioned facing the working surface.

Still, in order to maintain the food at a cool temperature effectively, the device of the invention will advantageously comprise, to create the said layers of cool gaseous fluid (air):

flow generator means, a flow-channelling circuit comprising a flow delivery opening above the said zone of work, presentation, or laying out of the foods, an opening for recovery of the flow diffused onto this zone, and a flow circulation conduit linking the distribution and recovery openings, this conduit passing at least under the main part and in contact with the lower surface of the said zone of work, presentation or laying out of the foods, and (preferably) a site reserved in the flow-channelling circuit of the flow, to receive uniquely a part of the said flow generator means.

Always with a view to the good conservation of the foods and to the performance of the installation in relation to its cost, a complementary characteristic of the invention envisages that advantageously the above-mentioned flow circulation conduit has a (substantially) horizontal section defined on the upper part by the lower surface of the said area of work, presentation or laying out of the food and attached laterally to two elbows each approximately at 180 degrees, for reorientation of the flow, these two elbows terminating, one at the distribution opening, the other at the recovery opening, the two openings each being situated approximately at the same height above two opposite ends of the said area.

Concerning this zone, two possible embodiments have more particularly been envisaged:

the first envisages that the said zone has a working surface bordered on at least one side by a removable strip for carrying accessories limited frontally and above by a substantially vertical panel (for example a glass pane), the strip communicating on its lower face with the cool environment flow circulation conduit.

the second envisages that this zone can be essentially in the form of a succession of trays placed one beside the other and in contact, above and below, with the said cooled gas flow, this succession of trays being itself bordered by the above-mentioned strip with the front panel and having the same direct communication, on its lower face, with the cooled fluid circulation conduit.

It is to be noted that the preceding characteristics are well able to meet the hygiene conditions imposed or anticipated.

In this regard, a complementary characteristic of the invention anticipates that the said zone of work, presentation or laying out of the foods will be bordered by a support frame supported by the above-mentioned elbows or the limiting lateral walls of the conduit and on which can rest peripherally the working surface or the trays.

As far as hygiene is concerned, it is proposed that the bottom of the flow circulation conduit includes a waste outlet opening into a removable recovery tray. Moreover, in order to improve the performance of the installation, the circulation or the renewing of the air in this environment of the zone of work, presentation or laying out of the foods, once again, just like the hygiene of the entirety of the device, a complementary characteristic of the invention anticipates that advantageously:

the inlets for distribution and recovery inlets of air (gas) will have substantially horizontal strips to channel the flow, in order to ensure a preferably substantially laminar flow between them, in contact with the above-mentioned elbows which will then be advantageously rounded, and above all:

the recovery opening will have a filter for the said flow, carried by a removable frame on the corresponding elbow, as well as indirect heat exchange means between the recovered gas flow and a cool fluid, and the circulation conduit will have a fan situated preferably in proximity to the elbow where the recovery opening is situated.

Correspondingly, the flow generator means will comprise, as well as the above-mentioned fan, a drive motor for this fan, with, as a distinctive feature, the fact that the fan will be placed in the conduit, in proximity to the elbow where the recovery opening is situated, whilst the motor will for preference be isolated from the flow channelling circuit.

In a comparable manner, it is moreover recommended that the cold generation unit associated with the above-mentioned heat exchange means should be installed away from the flow channelling circuit and that it should be isolated from it by a separation wall only traversed by pipes. It will be advantageously the same with the fan drive motor mentioned hereinabove, only the linking cables between them then traversing the said separation wall.

According to another characteristic of the invention, the preceding device will not have a fixed location. It will thus be considered as movable equipment.

In this regard, in order to allow its movement, it is anticipated that it will be formed as a table or a stand, comprising then not only the device according to any of the characteristics described hereinabove, but equally support legs on which the devices will rest, the base in question being adjustable in height and/or being mounted on castors.

According to particular embodiments, all or part of the following characteristics will moreover be able to be retained:

the flow cooling system can be of the thermo-siphon type with a motorised unit or any other means according to the energy source available, the production of cold is assured by means of a calorific fluid free of "CFC" gas, the cooling can be either lateral or frontal the cooling may be static or by forced ventilation, the cooling can comprise a dust filtering system, the working surface can be equipped with a removable support for various uses, the working surface can be equipped with a waste drainage pipe, the working surface can be removable, the working surface can be composed of several sections, the working surface can be composed of removable accessories and contents, the working surface can be composed of different materials, the working surface can be lined with smooth removable sheets on an underlying base, the working surface can be bordered with a glass panel(s), the working surface can include lighting, the working surface can rest on sections with rounded grooves, the diffusion tank (formerly called "flow circulation conduit") can be composed of sections supporting the working surface, the diffusion tank can be equipped with a removable drawer, the diffusion tank can be equipped with a draining conduit, the diffusion tank can be equipped with a removable waste receptacle, the diffusion tank can be equipped with a waste guide, the casing of the device can serve as a diffusion tank, the casing can assume different forms, rounded and/or angular, the rounded casing can act locally as a deflector, the casing can act as a retention tank (of condensates in particular), the casing can act as a draining tank, the casing can act as a support for the different parts of the device, the diffusers (formerly called "openings") can be other than of metal, the diffusers can be composed of guiding strips, the diffusers can be equipped with removable filters, the removable filters can be of metal, switching on is executed by means of a control equipped with means for switching off, the refrigerating equipment (or cold preservation unit) is lodged under the working surface and under the air circulation conduit, the refrigerating equipment can be made removable for maintenance, the refrigerating equipment can be lodged on telescopic runners, the evaporators and filters can include condensation trays, the condensation trays can be removable, the refrigerator unit casing can have ventilation grilles, the ventilation grilles of the casing can be disposed laterally, the electrical controls can be equipped with a voltage indication, the electrical controls can be equipped with a temperature indicator, the refrigerator circuits are exterior to the diffusion tank.

The attached drawings illustrate the invention, without however imposing any limitation.

FIG. 1 shows a sectioned front view of an embodiment of the invention,

FIG. 2 is a view from below according to the arrow II of FIG. 1,

FIG. 3 is a section taken the line III—III of FIG. 2; and

FIG. 4 is a variant embodiment, according to the same view in section as that of FIG. 3.

With reference to these drawings, the device comprises an air recovery recycling or regeneration (or simply extraction) opening 1a equipped with a diffuser 4 a grille (preferably with horizontal strips) and with a filter 5 carried by a removable frame and facing a heat exchange unit 6 traversed by a flow of air 1. This air is driven by a fan 2 and guided insulated from the fan motor 2a in a diffusion duct (or conduit) 16 prolonged laterally by two lateral shaped casing 30a, 30b to be delivered to the opening 1b, itself equipped with a diffuser 4 with horizontal strips and with an air filter 5. The casings 30a, 30b each define internally a hollow elbow "in the shape of a hair pin" communicating with the central rectilinear horizontal part 16a of the duct 16 and forming, on either side of the working surface 9, respectively an air recovery channel 3a and an air delivery channel 3b, each channel terminating at one of the openings 1a, 1b both situated above the level of the horizontal working surface 9. Above the surface 9, the device is open, although limited frontally by a wall 20 higher than the surface 9. This working surface 9 has an upper surface 9a and a lower surface 9b. Its upper surface 9a is cooled by the cold air delivered by the channel 3b, whilst its lower face is washed by the equally cold air (≈3° C.) which circulates in 16, since the surface 9 defines the upper surface of the central section 16a of the duct 16, between the channels.

In the embodiment of FIGS. 1,2 and/or 3 or 4, the shaped casings of the device support the working surface 9 by means of a frame 27 which is supported in particular by the lateral walls 32a, 32b of casings; the working surface 9 is provided at 14 with a drainage pipe. This drainage pipe projects under the working surface, up to the diffusion shaft 33 which it traverses in order to communicate with a receptable 15 situated underneath (FIG. 3).

The diffusion shaft drains at 17 into a removable receptacle 18. According to a variant not illustrated this drainage may take place into a liquid waste reservoir.

The working surface 9 is bordered by a support strip 19 for one or more removable accessories, which is over a longitudinal side of the conduit 16, on the central section 16a.

According to a variant not illustrated, the base accepts a series of different accessories such as troughs and different equipment, (knife holders and other utensils, electrical equipment holders, indicator equipment . . . )

In FIG. 3, the pane 20 is retractable.

The feeding of cooling fluid to the indirect heat exchange unit 6 is assured by a cold generator 10 lodged at the exterior of the cooling flow channelling duct 16, thus away from the circulation circuit of this air, as is also elsewhere the motor 2a of the fan 2 (which is itself lodged at an end of the section 16a, near the recovery drainage pipe 3a).

An internal partition 32 moreover isolates the motor 2 with regard to the fan 2. This partition is traversed only by the motor/fan unit connector shaft 2b and by the links (shown schematically all together at 6a) between the heat exchange unit 6 lodged in the drainage pipe 3a with the filter 5 and the generator unit 10.

In FIG. 1, the cooling equipment 10 for the generation of cold (about 3° C.) is lodged below the device and is ventilated by open grilles 12 in a protection cover. It is mounted on slides 11 and has controls 13 in its front face.

Moreover, the whole of the device of the invention is supported by a base comprising vertical tubes 21 furnished with pivoting wheels. According to a variant illustrated in FIG. 4, the whole of the device of the invention can be supported by tubular legs 22 having feet adjustable in height.

In the two cases, it is thus a question of an assembly with the aspect of a table or a stall.

According to the variant illustrated in FIG. 4, the device of the invention can be equipped with one or several removable frames 25,27 carried by the framework or the casing of the device and receiving removable trays 26 of different forms and materials. It could be the same framework as that used to support the working surface 9 (see FIG. 3).

FIG. 4, the device can receive at 19 retractable supports 28 for a glass breath shield 29 or any other accessory.

A removable stopper 34 seals the drainage pipe of the channel shaft 16.

As a non-limitative example, the casing of the device of the invention can have dimensions of the order of 1400 mm in length, of 800 mm in width and 1003 mm in height. The working surface 9 can be about 850 mm from the ground.

The device according to the invention is particularly intended for the farm produce industries, and for preparations in butchery, charcuterie, the fish trade, industrial kitchens and patisserie catering.

What is claimed is:

1. A device for the processing, presenting or laying out food, comprising:
    a zone for processing, presentation or laying out food, said zone having an upper surface, a lower surface, a front edge where a user is optionally positioned, and lateral edges, said zone being upwardly open and in contact on its upper and lower surfaces with a layer of gaseous fluid at a temperature lower than the temperature of an external environment where the device is disposed,
    means for generating a flow of gaseous fluid to create said layer of gaseous fluid,
    a flow channeling circuit comprising a flow delivery opening above said zone, a recovery opening to capture the flow of gaseous fluid passing over said zone,
    a flow circulation conduit connecting the delivery and recovery openings, the flow circulation conduit passing below and in contact with the lower surface of said zone,
    means for cooling said layer of gaseous fluid to a temperature lower than the external environment where the device is disposed,
    wherein said gaseous flow delivery and recovery openings are disposed laterally, so that the flow circulates between said openings,
    and wherein said zone has a work surface bordered by a removable strip for holding accessories limited at the front by a substantially vertical panel, said strip communicating on the lower face with the flow circulation conduit.

2. A device according to claim 1, wherein said zone is bordered by a support frame supported by lateral limiting walls of the flow channeling circuit and on which rests peripherally a work surface.

3. A device according to claim 1, wherein the bottom of the conduit has a waste outlet connected to a removable recovery container.

4. A device according to claim 1, wherein the flow recovery opening includes a filter for said gaseous flow, means for indirect heat exchange between a cooling fluid and said flow, and wherein the flow circulation conduit contains a fan situated in proximity to the elbow where the flow recovery inlet is situated.

5. A device according to claim 1, wherein
    the flow generation means comprises a fan including a plurality of fan blades and a motor for driving the fan blades, the fan blades being disposed in the conduit in proximity to the elbow where the flow recovery inlet is situated, and the motor is isolated by a partition of the flow channeling circuit, and
    the cooling means comprises a cold fluid generator and heat exchanger between said generated cold fluid and the gas flow to be cooled, the heat exchanger being disposed in the flow recovery opening of the flow circulation conduit, wherein the cold fluid generator is isolated by a partition of said flow channeling circuit.

6. A device for processing, presenting or laying out food, comprising:
    a zone for processing, presentation or laying out food, said zone having an upper surface, a lower surface, a front edge where a user is optionally positioned, and lateral edges, said zone being upwardly open and in contact on its upper and lower surfaces with a layer of gaseous fluid at a temperature lower than the temperature of an environment where the device is disposed, means for generating a flow of gaseous fluid to create said layer of gaseous fluid, a flow channeling circuit comprising a flow delivery opening above said zone, a recovery opening to capture the flow of gaseous fluid passing over said zone, a flow circulation conduit connecting the delivery and recovery openings, the flow circulation conduit passing below and in contact with the lower surface of said zone, a means for cooling said layer of fluid gas to a temperature lower than the external environment where the device is disposed, wherein said flow delivery and recovery openings are disposed laterally, so that the gaseous flow circulates between said openings, and wherein the zone is formed essentially as a succession of removable trays disposed one beside the other and in contact, above and below, with said gaseous flow, said succession of trays being bordered, at lease one side by a removable strip for holding accessories limited frontally by a substantially vertical panel, said strip communicating at its lower face with the flow circulation conduit.

7. A device for processing, presenting or laying out food, comprising:

a zone for processing, presentation or laying out food, said zone having an upper surface, a lower surface, a front edge where a user is optionally positioned, and lateral edges, said zone being upwardly open and in contact on its upper and lower surfaces with a layer of gaseous fluid at a temperature lower than the temperature of an external environment where the device is disposed, means for generating a flow of gaseous fluid to create said layer of gaseous fluid, a flow channeling circuit comprising a flow delivery opening above said zone, a recovery opening to capture the flow of gaseous fluid passing over said zone, a flow circulation conduit connecting the delivery and recovery openings, the flow circulation conduit passing below and in contact with the lower surface of said zone, means for cooling said layer of gaseous fluid to a temperature lower than the external environment where the device is disposed, wherein said gaseous flow delivery and recovery openings are disposed laterally, so that the flow circulates between said openings, and wherein the flow circulation conduit has a substantially horizontal section delimited on its upper part by the lower surface of said zone and is attached laterally to two elbows substantially at 180° for reorientation of the flow, one of said elbows terminating at the delivery opening, and the other of said elbows terminating at the recovery opening, both situated substantially at the same height above the opposite lateral extremities of said zone, and wherein said zone has a work surface bordered by a removable strip for holding accessories limited at the front by a substantially vertical panel, said strip communicating on the lower face with the flow circulation conduit.

8. A device for processing, presenting or laying out food, comprising:

a zone for processing, presentation or laying out food, said zone having an upper surface, a lower surface, a front edge where a user is optionally positioned, and lateral edges, said zone being upwardly open and in contact on its upper and lower surfaces with a layer of gaseous fluid at a temperature lower than the temperature of an environment where the device is disposed, means for generating a flow of gaseous fluid to create said layer of gaseous fluid, a flow channeling circuit comprising a flow delivery opening above said zone, a recovery opening to capture the flow of gaseous fluid passing over said zone, a flow circulation conduit connecting the delivery and recovery openings, the flow circulation conduit passing below and in contact with the lower surface of said zone, a means for cooling said layer of fluid gas to a temperature lower than the external environment where the device is disposed, wherein said flow delivery and recovery openings are disposed laterally, so that the gaseous flow circulates between said openings, and wherein the flow circulation conduit has a substantially horizontal section delimited on its upper part by the lower surface of the said zone and is attached laterally to two elbows substantially at 180° for reorientation of the flow, one of said elbows terminating at the delivery opening and the other of said elbows terminating at the recovery opening, both situated substantially at the same height above the opposite lateral extremities of said zone, and wherein the zone is formed essentially as a succession of removable trays disposed one beside the other and in contact, above and below, with said gaseous flow, said succession of trays being bordered, at lease one side by a removable strip for holding accessories limited frontally by a substantially vertical panel, said strip communicating at its lower face with the flow circulation conduit.

\* \* \* \* \*